(12) United States Patent
Wortberg

(10) Patent No.: US 8,531,808 B2
(45) Date of Patent: Sep. 10, 2013

(54) DEVICE AND METHOD FOR SECURING AN ELECTRIC LINE WITH A CONTROLLABLE SWITCHING ELEMENT

(75) Inventor: Michael Wortberg, Geisenhausen (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 43 days.

(21) Appl. No.: 13/380,575

(22) PCT Filed: Jun. 8, 2010

(86) PCT No.: PCT/EP2010/057987
§ 371 (c)(1),
(2), (4) Date: Feb. 17, 2012

(87) PCT Pub. No.: WO2011/000670
PCT Pub. Date: Jan. 6, 2011

(65) Prior Publication Data
US 2012/0134062 A1    May 31, 2012

(30) Foreign Application Priority Data
Jul. 1, 2009 (DE) .......................... 10 2009 027 387

(51) Int. Cl.
*H02H 9/08* (2006.01)
(52) U.S. Cl.
USPC .......................................... 361/87; 361/93.9
(58) Field of Classification Search
USPC .......................................... 361/87, 93.7–93.9
See application file for complete search history.

(56) References Cited

U.S. PATENT DOCUMENTS

| 6,424,512 B1 * | 7/2002 | Schmacht | 361/93.1 |
| 7,268,992 B2 * | 9/2007 | Hallak et al. | 361/93.7 |
| 2009/0207545 A1 * | 8/2009 | Chang | 361/93.9 |
| 2011/0012424 A1 | 1/2011 | Wortberg et al. | |
| 2011/0141643 A1 | 6/2011 | Hummel et al. | |

FOREIGN PATENT DOCUMENTS

| AT | 506092 B1 | 6/2009 |
| DE | 298 19 621 U1 | 3/1999 |
| DE | 103 59 736 A1 | 7/2005 |
| DE | 10 2006 032 879 A1 | 1/2008 |
| DE | 10 2006 033 044 A1 | 1/2008 |
| DE | 10 2007 062 955.0 B4 | 7/2009 |
| EP | 0 713 279 A1 | 5/1996 |
| WO | WO 2005/015704 A2 | 2/2005 |
| WO | WO 2008/098532 A1 | 8/2008 |

(Continued)

*Primary Examiner* — Danny Nguyen
(74) *Attorney, Agent, or Firm* — Wolf, Greenfield & Sacks, P.C.

(57) ABSTRACT

The present invention relates to a device and a method for reliably securing an electric line with a controllable switching element, wherein the device and the method can be easily adapted to the properties of an electric line. The device comprises a controllable switching element (110, 610) that is designed to take on at least two states, specifically a first state with a first resistance and a second state with a second resistance that is lower than the first resistance. The invention further comprises a current measuring device (120, 620) for measuring a current via the line; an averaging device (125, 625) for determining at least one first current pulse on the basis of the measured current, averaged over a first duration, and a second current pulse, averaged over a second duration that is longer than the first duration; and a controller (130, 630) for controlling the switching element such that the switching element switches into the first state when the first or the second averaged current pulse exceeds a first or second threshold value of a tripping characteristic curve.

17 Claims, 9 Drawing Sheets

(56) References Cited

FOREIGN PATENT DOCUMENTS

| WO | WO 2009056903 A1 | 5/2009 |
| WO | WO 2009/080807 | 7/2009 |
| WO | WO 2010/045757 A1 | 4/2010 |

* cited by examiner

DEVICE AND METHOD FOR SECURING AN ELECTRIC LINE WITH A CONTROLLABLE SWITCHING ELEMENT

FIELD OF THE INVENTION

The present invention relates to a device and a method for securing an electric line with a controllable switching element, and in particular a device and a method which are formed such that an intelligent control of the switching element secures the line.

PRIOR ART

Conventionally, electric lines e.g. in a vehicle are secured by fuses which typically are designed for a uniform load on the line. Previously lines in a vehicle were secured above all by melt fuses. Brief pulse loads characterised by high current peaks can however shorten the life of a fuse, since although under certain circumstances they do not cause problems for the electric line, the fuse can be stressed because the pulse loads come close to the actual tripping conditions so that frequently recurring pulse loads shorten the life of the fuse. If for example fuses melt in the range from 40 to 50 A, repeated current peaks in the range above 30 A lead to wear and ageing of the fuse. Consequently electrical fuses are typically designed for higher currents whereby the dimensions of the electric line must be adapted accordingly, leading to a greater use of materials and resources.

FIG. 8 shows the current capacity of a line and its melt fuse over pulse length $\Delta t$. FIG. 8 shows several curves of a current-time characteristic for melt fuses and lines. In particular FIG. 8 shows an example of an electric line with a diameter of 10 $mm^2$ under a temperature rise of 30° and at a temperature rise of 100°, and a melt line of an electric fuse of 70 A and a melt line of the same melt fuse after one million usage cycles. It is evident from the diagram that the line has a high thermal inertia which is not however present in the melt fuse (see high currents on the x axis and short pulse lengths on the y axis). For example a current pulse of 1000 s duration (approximately direct current) can be tolerated by the line with a current intensity of 55 A, but by the fuse however with a current intensity of 100 A, wherein to protect the line heating by a temperature rise of more than 30° C. should be avoided.

As the curves for a fuse and line cannot be brought to overlap, a melt fuse cannot optimally protect a line. In the example shown in FIG. 8 the line is secured in the range of t<10 s, but in the range of t>50 s (uniform load), overload currents (creeping short circuit, overload) can lead to a destruction of the electric line. As the characteristics of the melt fuse and line are not adapted, in the design of line sets an inherent over-dimensioning of the cross section of the electric line takes place, leading to an inefficient use of resources e.g. copper.

Whether a line and fuse pair can tolerate a load depends on the load profile of the load. In the example shown, the fuse would trip with a current pulse over the line having a duration of 1 s with 300 A in the load current, although the line could tolerate this current pulse. It is therefore difficult if not impossible to find the a fitting melt fuse for a line.

Conventionally thermal models are known which can be used to monitor the temperature in a line, wherein a line can be isolated if the temperature exceeds a maximum temperature value. Such a thermal model for example uses the measured current flowing through the line.

FIG. 9 shows a measured load profile of a line in a vehicle. Due to the strong fluctuations in current intensity, it is clear that a thermal model which measures a particular current value in the time range to calculate a temperature only offers sufficient accuracy if the load profile is substantially constant, as a temperature increase in the line depends not only on a current value but above all on how long the current value is present.

However as shown in FIG. 9, the current intensity in modern onboard networks varies very greatly, since in particular in motor vehicles a large number of complete different consumers (loads) is connected to the onboard network.

SUMMARY OF THE INVENTION

The present invention is based on the object of preparing a reliable device and method to secure an electric line which can easily be matched to the properties of an electric line.

According to an embodiment the device for securing an electric line comprises a controllable switching element which is designed to assume at least two states, namely a first state with a first resistance and a second state with a second resistance lower than the first resistance. Furthermore the device comprises a current measuring device for measuring a current over the line, an averaging device for determining, on the basis of the current measured, a first current pulse averaged over a first duration and a second current pulse averaged over a second duration longer than the first duration, and a controller for controlling the switching element so that the switching element switches to the first state when the first or second averaged current pulse exceeds a first or second threshold of a tripping curve.

By use of at least two threshold values, the device can be adapted to the characteristic curve of an electric line. In particular by averaging current pulses over durations of varying length, not only can a hard short circuit be detected but also a creeping short circuit. Thus the device comprises an intelligent fuse which can measure a load spectrum and compare averaged current pulses with values of a tripping curve which correlates approximately to the thermodynamic properties of the line.

According to an advantageous embodiment the averaging device is designed to obtain the quadratic mean of several individual current pulses in a first duration as the first current pulse and/or to obtain the quadratic mean of several individual current pulses in the second duration as a second current pulse. By quadratic averaging over pulse lengths, a number of several individual current pulses of a particular length can be replaced by an averaged current pulse. Such a quadratic averaging constitutes an energy equivalent averaging i.e. the thermal equivalent to the individual current pulses. Thus the temperature behaviour of the line can be measured reliably indirectly via the current.

According to an advantageous embodiment the device comprises a memory for storing the first and second threshold values of the tripping curve which show at which current pulses the switching element is to be switched. Thus the device can easily be adapted to characteristic curves of other lines since different threshold values can be stored for different lines.

According to another embodiment the memory is designed to store at least four threshold values of the tripping curve for four different current pulse length decades. Thus a large range of pulse lengths can be covered so that overloads can be reliably detected for various types of short circuits, hard and creeping short circuits. Preferably the four current pulse length decades extend over a duration of 0 to 0.01 s; 0.1 s; 10 s and 100 s.

According to a further advantageous embodiment the controllable switching element can be connected in series with the electric line. Thus the electric line can be secured without using a fuse merely via the controllable switching element.

According to a further advantageous embodiment the device furthermore comprises an electric fuse for securing the electric line. In particular the electric fuse and the controllable switching element are formed as a parallel circuit which can be connected in series with the electric line. Thus the switching element can take over parts of the pulse load and relieve the load on the electric fuse, whereby pulse loads acceptable by the line can occur in the device without tripping the fuse.

According to a further advantageous embodiment the electric fuse is arranged in a first branch of the parallel circuit which has a third resistance and the controllable switching element is arranged in a second branch of the parallel circuit, wherein the first resistance is higher than the third resistance and the second resistance is lower than the third resistance, and the switching element is designed to switch to the second state on a pulse load condition. Thus pulse loads acceptable by the line can occur in the device without tripping the fuse.

According to a further advantageous embodiment the pulse load conditions constitute an exceedance of a pulse load threshold value by the averaged current pulse flowing through the parallel circuit. Thus the switching element can be controlled depending on a particular pulse load threshold value in order to protect the fuse as long as the line is still designed to carry the current pulse.

According to a further advantageous embodiment the controllable switching element is designed to switch from the second state to the first state on an overload condition. Thus e.g. if a particular current intensity is exceeded for a particular time which cannot be tolerated by the line, this overload condition can cause the electric fuse to trip.

According to a further advantageous embodiment the controllable switching element switches from the second state to the first state when the current pulse flowing through the parallel circuit and then averaged falls below a second pulse load threshold value. Thus the device can revert to normal state in that the current is largely or completely carried by the fuse or flows via the fuse.

According to a further advantageous embodiment the current measurement device is connected in series with the switching element and/or the electric fuse to measure the current pulses. Thus a load profile of the current flowing over the line and the corresponding current pulses can be obtained reliably.

According to another embodiment an onboard network for power supply of a vehicle, in particular an automobile, comprises the devices described above.

According to another embodiment a method for securing an electric line comprises measuring a current over the line, on the basis of the measured current determining at least one first current pulse averaged over a first duration and a second current pulse averaged over a second duration that is longer than the first duration, and switching of a switching element from a second state to a first state when the first or second averaged current pulse exceeds a first or second threshold value of a tripping curve. The first state has a first resistance and the second state a second resistance which is lower than the first resistance.

Thus an electric line can be reliably secured against hard or creeping short circuits.

According to an advantageous embodiment the threshold values of the tripping curves are selected such that they lie on a curve of the line or between values on the curve of the line and a load spectrum curve which indicates a temporal current distribution at the largest permitted currents in normal operation of at least one load on the line. Thus the method can be adapted to the curve of the line to be used.

Further advantageous features of the invention are disclosed in the detailed description of the embodiments and in the claims.

BRIEF DESCRIPTION OF THE DRAWINGS

In the following, the invention is described in detail with reference to the enclosed drawings.

DESCRIPTION OF THE PREFERRED EMBODIMENT

Figure 1:
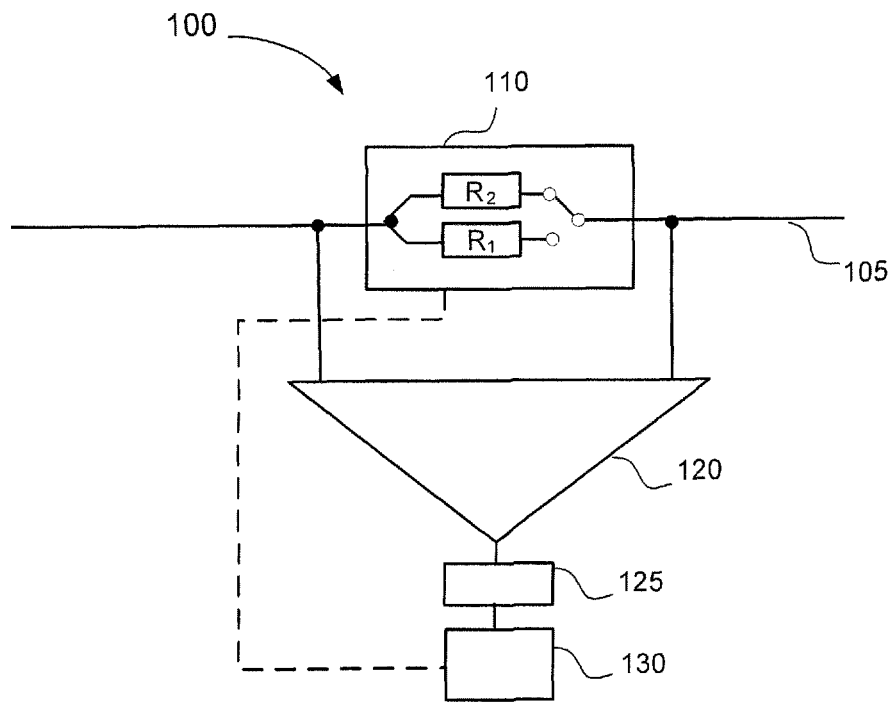
FIG. 1 shows diagrammatically a device for securing an electric line according to one embodiment.

Preferred embodiments of the present invention are described in detail below with reference to the accompanying drawings. In the various drawings the same or corresponding elements are designated with the same or similar reference numerals.

The preferred embodiments of the invention which are described in detail below are described with reference to a device for securing an electric line in a vehicle. It is however noted that the following description contains merely examples and should not be regarded as restrictive of the invention.

FIG. 1 shows diagrammatically elements of a device for securing an electric line 105 as can be used for example in a vehicle. The device 100 comprises a controllable switching element 110, a current measuring device 120, an averaging device 125 and a controller 130. The averaging device 125 can also be integrated in the current measuring device 120 or the controller 130.

As shown in FIG. 1, the controllable switching element 110 is formed such that it can assume two states, namely a first state with a first resistance $R_1$ and second state with a second resistance $R_2$ which is lower than the first resistance.

In normal operation of the device 100, the controllable switching element 110 is in the second state so that current can flow without or with only a slight resistance over the switching element 110. For example the second resistance is $R_2$=Rdson=1 mΩ, as in the example of FIG. 7b with a power semiconductor.

The controllable switching element can for example be a power semiconductor, in particular a power MOSFET as described in patent application DE 10 2007 062 955. In the case of a power MOSFET the first state of the controllable switching element 110 corresponds to an opened power MOSFET so that the electrical resistance $R_1$ in the first state is so great that practically the entire current flow is interrupted. At high currents a parallel circuit of several power MOSFETs is suitable so that only parts of the current flowing over the line flow over one power MOSFET each. Naturally other field effect transistors can also be used instead of metal oxide semiconductor field effect transistors (MOSFETs) which are switchable via low gate voltages with minimum delay.

The current measuring device 120 serves to measure a current on line 105. The current measuring device can measure the current continuously or at certain time intervals and where applicable convert this into a digital signal via an A/D converter.

The averaging device 125 using the measured current determines at least one first current pulse which is averaged over a first duration and a second current pulse averaged over a second duration. The averaged current pulses are based on a number of individual current pulses measured by the current measuring device in a particular time interval, the length of which defines the duration e.g. 1 s. The second duration is longer than the first duration for example by a factor of 10 so that different pulse lengths are detected by the different durations. Averaging over longer times is less sensitive for individual, short very high current pulses but better for longer strong current pulses and for a sequence of several short, very high current pulses in the time window.

Figure 8:
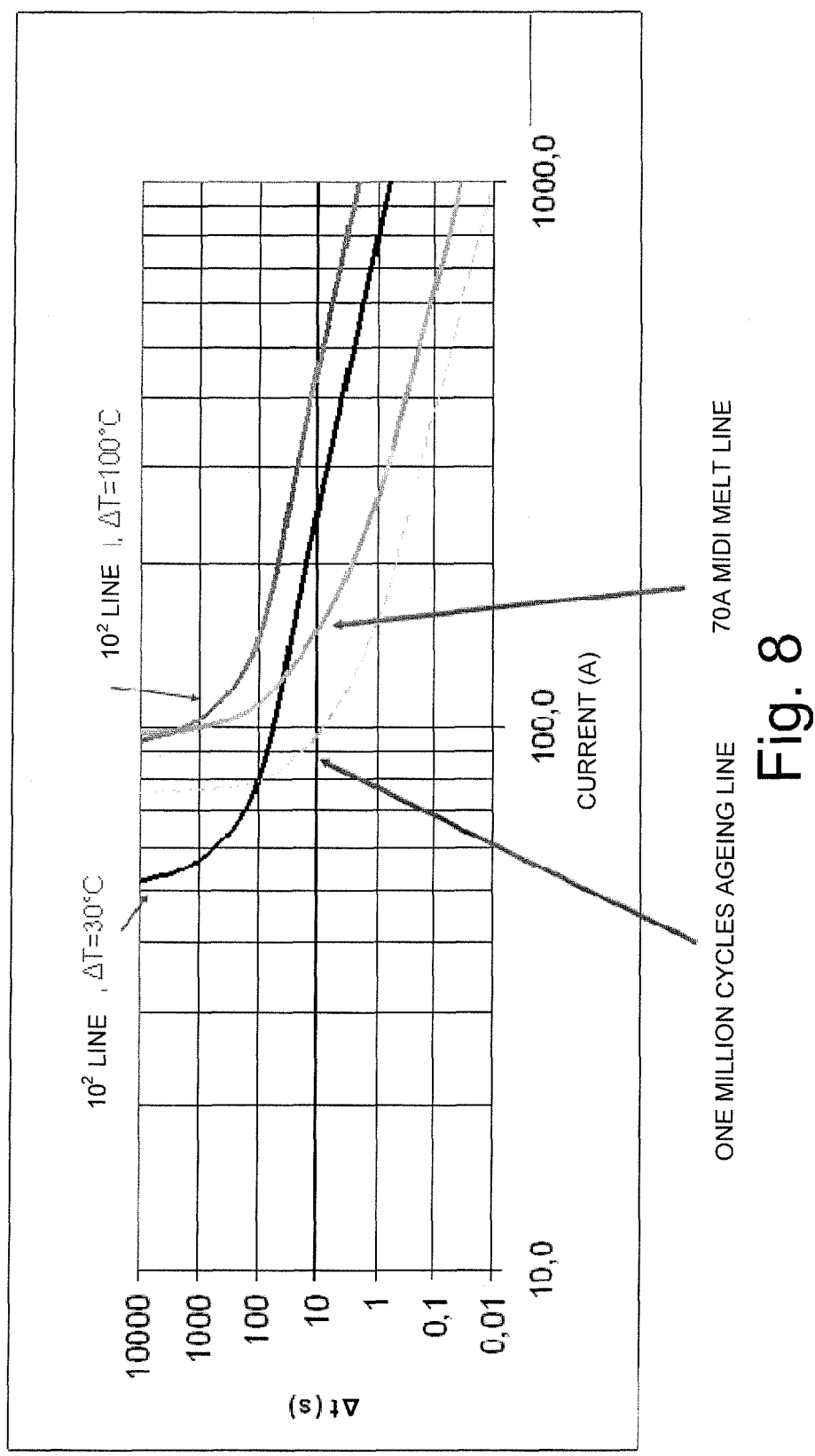
FIG. 8 shows the current carrying capacity of an electric line and a melt fuse over the pulse length.
Figure 9:
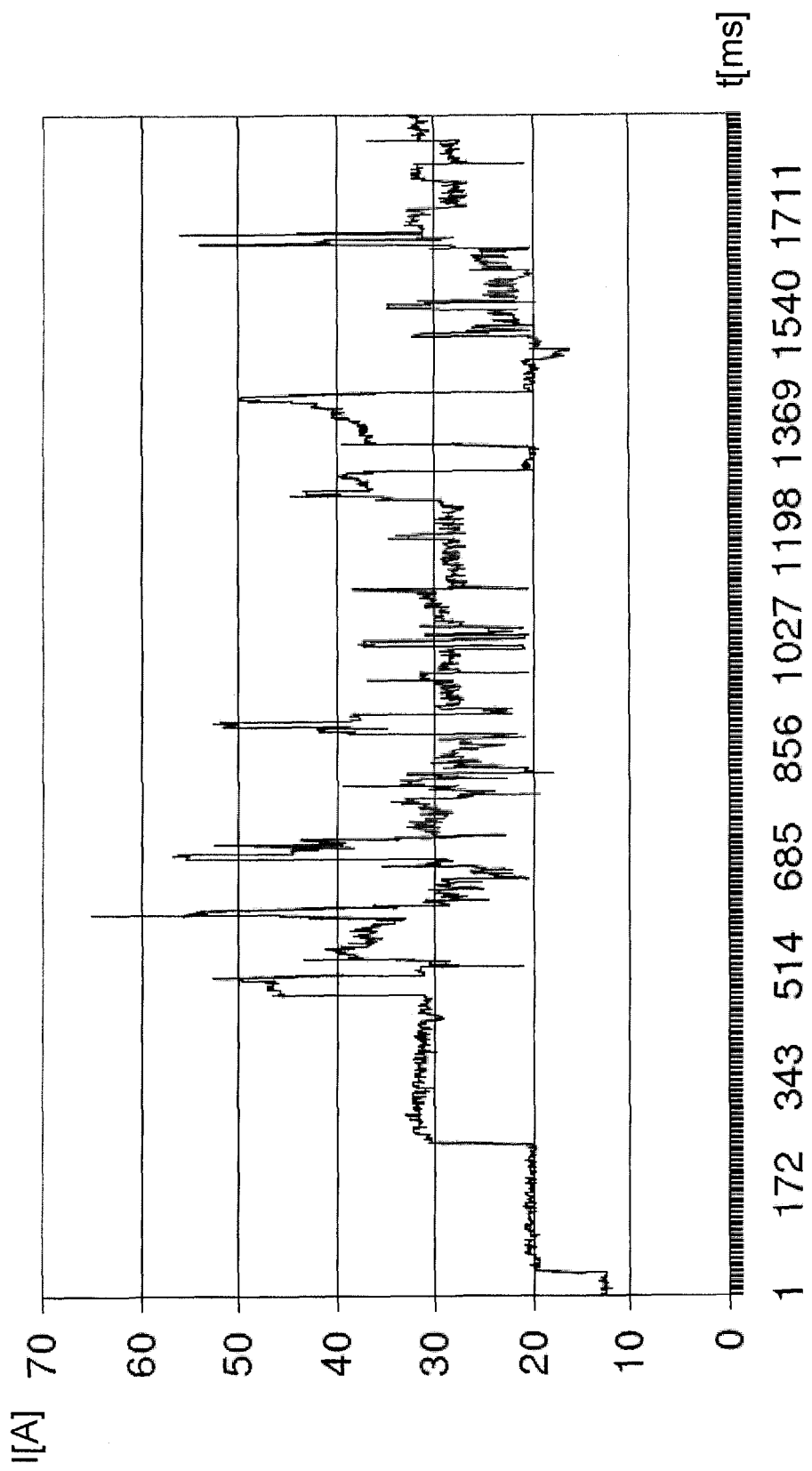
FIG. 9 shows a typical measured load profile of an onboard network.

By the averaging over different pulse lengths described in more detail below, a load profile as shown in FIG. 9 can be entered in a current-time diagram measured by the current measuring device 120, as indicated in FIG. 8. Thus analysis of a load spectrum can take place via averaging over pulse lengths.

Figure 2:
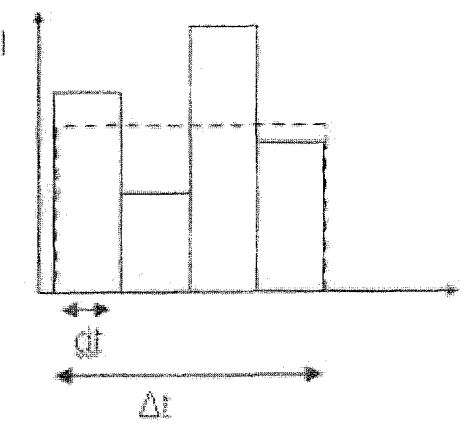
FIG. 2 shows an example of averaging of individual current pulses in a time window.

FIG. 2 shows four individual current pulses measured with the current measuring device 120 each with a width of 250 ms=dt. An averaging by the averaging device 125 of the four individual current pulses leads to an averaged current pulse with a length of $\Delta t=n\times dt$, which corresponds to a decade from 0 to 1 s (or on formation of a sliding mean, also 0.25 s to 1.25 s, 0.5 to 1.5 s, etc.). The dotted line indicates the averaged current pulse and on formation of a sliding mean, such as a 1 s wide time window, is shifted by 250 ms each time so that a 4-point smoothing of the load profile can be realised.

It is particularly advantageous to form the quadratic mean of several individual current pulses over the first and/or second durations. Therefore the averaging device 125 is preferably designed to obtain as the first current pulse the quadratic mean of several individual current pulses in the first duration and/or as the second current pulse the quadratic mean of several individual current pulses in the second duration. Such an averaging constitutes an energy equivalent averaging over pulse lengths, wherein the energy of the averaged current pulse can be obtained by:

$$W=I_1^2 \times R \times dt + I_2^2 \times R \times dt + \ldots I_n^2 \times R \times dt = I_E^2 \times R \times n \times dt,$$

wherein $I_x$ ($x=1,\ldots,n$) is the current intensity of an individual current pulse at a particular time interval. Thus a number of n current pulses $I_x$ of length dt can be replaced by an averaged current pulse of length $n\times dt$ with current intensity $I_E$. Here $I_E$ is calculated from the quadratic mean of the individual current pulses $I_x$ as follows $$I_E=\sqrt{(I_1^2+I_2^2+\ldots+I_n^2)/n}$$

$I_E$ from the current pulses $I_1, I_2, I_3$ and $I_4$ in the example shown in FIG. 2 is shown in FIG. 2 in dotted lines as a current pulse averaged over $\Delta t$.

If $I_E$ is designated as the averaged first current pulse, an averaged second current pulse can be determined similarly for example from a decade from 0 to 10 s. Here for example 40 individual current pulses of length 250 ms can be averaged, preferably quadratically, or 10 current pulses of length dt=1 s can be used wherein also 10 averaged first current pulses with $\Delta t=1$ s or 40 averaged first current pulses can be used (the 40 averaged first current pulses can for example be first current pulses each shifted by dt=250 ms and obtained by forming a sliding mean, so that cascading of filters is made possible).

In the above example it was assumed that dt=250 ms but larger or smaller durations can be used which depend only on the settings of measurement and analog-to-digital conversion of the current values in the line.

The controller 130 controls the switching element 110 so that the switching element 110 switches to the first state when the first or second averaged current pulse exceeds a first or second threshold value of a tripping curve.

Figure 5:
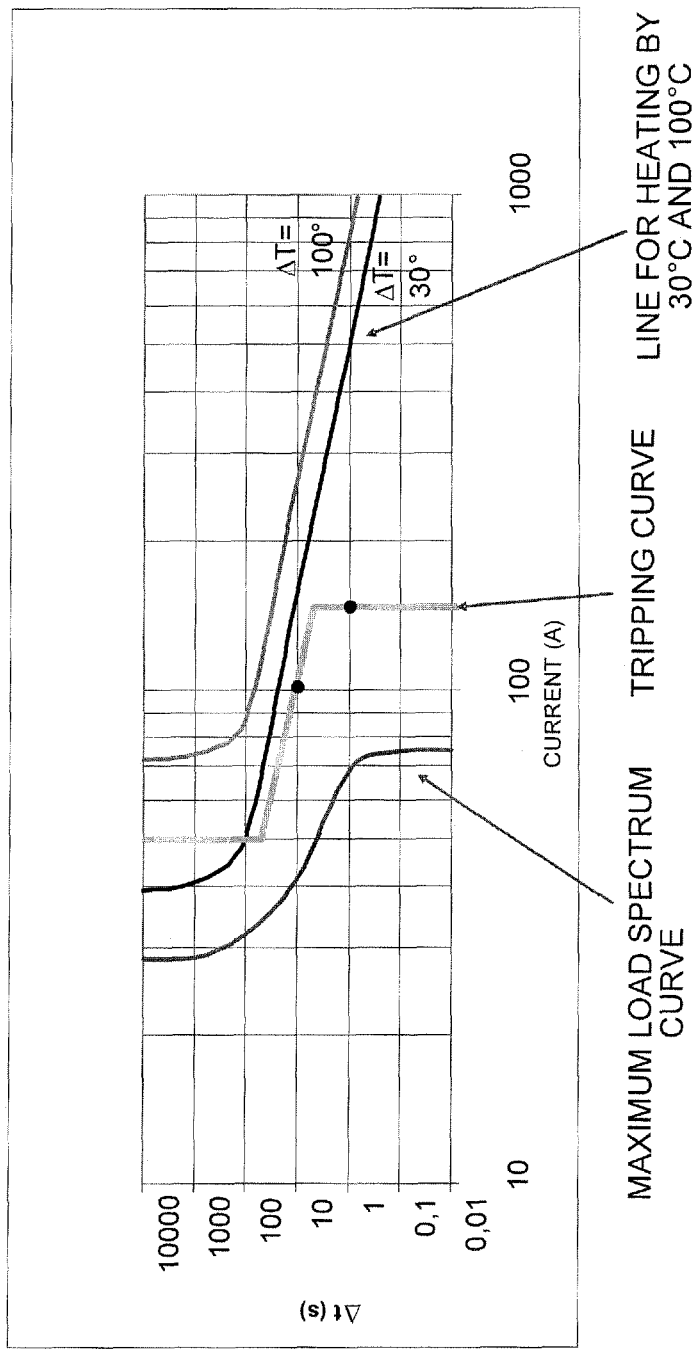
FIG. 5 shows a load spectrum curve, a characteristic curve of the line and a tripping curve of the device in a current-time diagram.

On the assumption of the example described above that the averaged first current pulse was averaged over the duration $\Delta t=1$ s and the second current pulse was averaged over the duration $\Delta t=10$ s, two threshold values are used, wherein the first threshold value is set for one current pulse length decade of $\Delta t=1$ s and the second threshold value for another pulse length decade e.g. $\Delta t=10$ s (see the two points in FIG. 5). These threshold values are values of a tripping curve in a current-time characteristic as described in more detail for example with reference to FIG. 5.

A tripping curve can be defined individually for each line and for various pulse lengths shows at which current value the switching elements should switch in order to protect the line. In other words this means that the device functions as a fuse and trips if a switch or the switching element is opened so as to exclude a current flow over the line.

The threshold values of the tripping curve which show at which current pulses the switching element should be triggered or switched, are for example stored in a memory. Naturally the threshold values can also be prespecified by a hard-wired circuit, wherein however a modification thereof is more complex.

To cover a greater range with further pulse lengths, the memory can also be formed to store more than two, for example four or six threshold values of the tripping curve for four or six current pulse length decades. Here the current pulse length decades can extend over a duration from 0 s to 0.01 s; 0.1 s; 1 s; 10 s; 100 s and 1,000 s.

In FIG. 1 the current measuring device 120 is connected in parallel with the controllable switching element 110 to measure the current over the line 105. However the current measuring device 120 can also be connected in series with the controllable switching element 110 to measure the current on the line 105, above all when the second resistance $R_2$ assumes a value close to 0Ω. The result of the current measurement of the current measurement device 120 is then passed to the averaging device 125 and thence to the controller 130 which receives the averaged current pulses and compares these with the appropriate threshold values of the tripping curve. Depending on the duration over which averaging took place, different threshold values can be defined as described later in detail with reference to FIG. 5.

The current measuring device can measure the current at different intervals, continuously or periodically, and the averaging can be carried out in the current measuring device or controller so that the averaging device can be integrated in these units.

Figure 3:
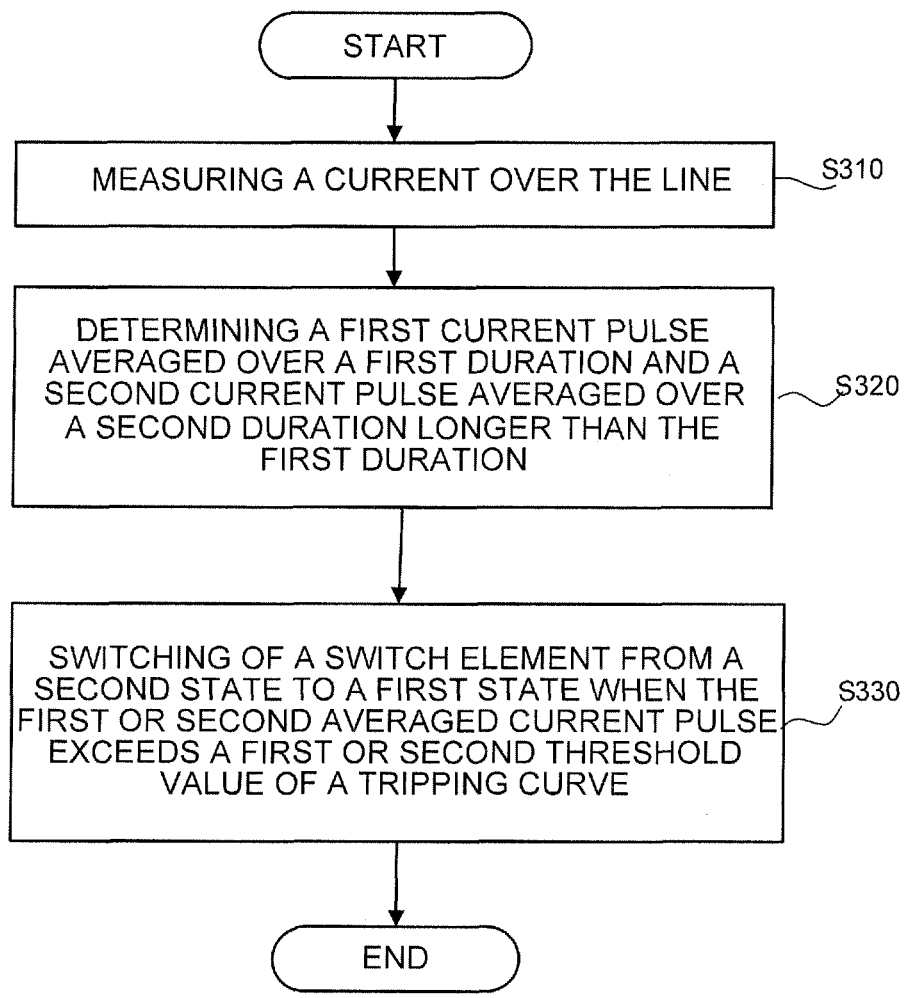
FIG. 3 shows a flow diagram which shows the steps of a method for securing an electric line according to a further embodiment.

FIG. 3 shows a flow diagram with the steps of a method for securing an electric line, in particular in a vehicle, according to a further embodiment. Here in a first step S310 a current is measured over the line. Then in step S320, by averaging, a first current pulse over the line is determined which is averaged over a first duration. Furthermore a second current pulse is determined which is averaged over a second duration that is longer than the first duration and preferably around ten times as long as the first duration, i.e. comprises another current pulse length decade.

In a third step S330 the switching element 110 switches from a second state to a first state when the first or second averaged current pulse passes a first or second threshold value. In particular the controller 130 is formed to obtain the determined current pulse from the current measuring device 120 and compare these for example with threshold values of a tripping curve stored in a memory and selected for the line to be secured.

The threshold values of the tripping curve and in particular the tripping curve itself can be selected such that they lie on a characteristic curve of the line to be secured or between the curve of the line and a load spectrum curve. The load spectrum curve shows a temporal current distribution at the maximum permitted currents in normal operation of at least one load on the line and is described in more detail below with reference to FIG. 4.

Figure 4:
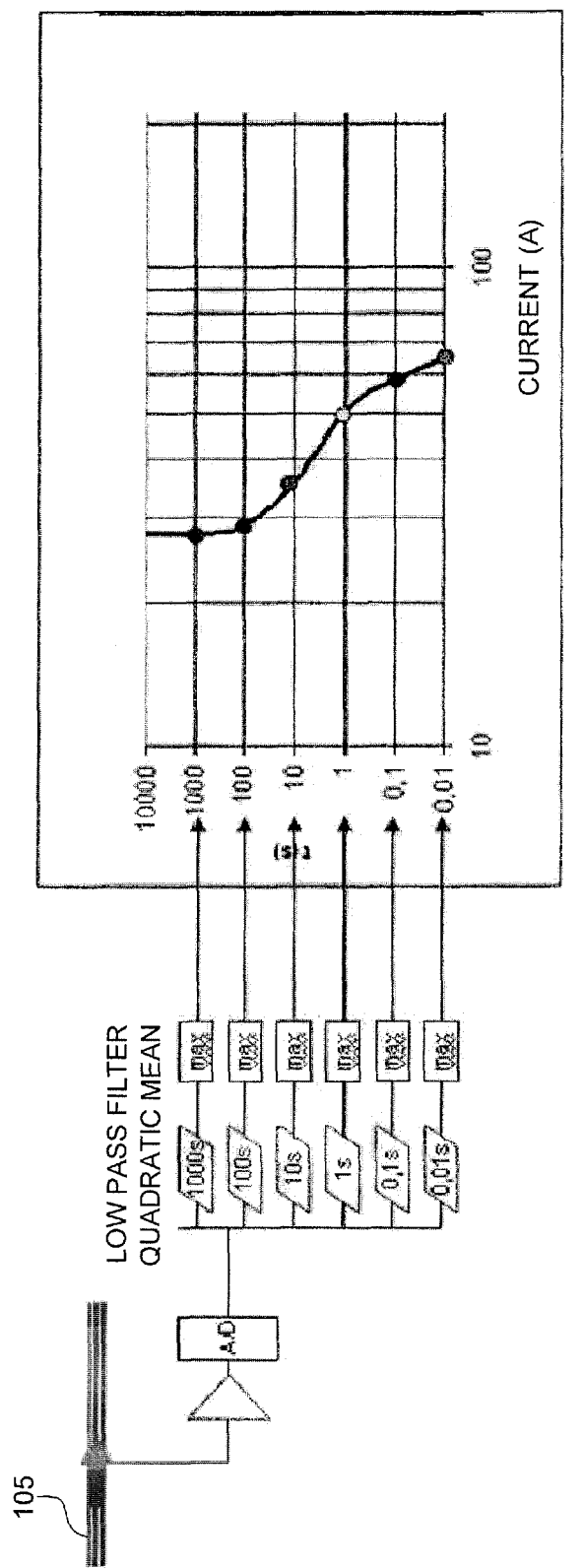
FIG. 4 shows diagrammatically how a load spectrum curve can be obtained.

FIG. 4 shows how a load spectrum curve can be obtained for one or more loads which are applied for example to an onboard network line of a vehicle. FIG. 4 shows diagrammatically the line 105 of FIG. 5 on which the load current flows, for example a load current as shown in the load current profile of FIG. 9.

To obtain the load spectrum curve, experimentally or by theoretical simulation, the load development with the maximum permitted currents which can occur in normal operation to be secured, is measured or determined in time span I(t) (see e.g. FIG. 9). The temporal development of the load current is subjected to a sliding quadratic averaging over 0.01 s, 0.1 s, 1 s, 10 s, 100 s and 1,000 s. Here as shown in FIG. 4 the current on the line 105 can be measured and subjected to an analog-digital conversion and then a quadratic averaging carried out using low pass filters. The maximum value from each decade filter is entered in the I($\Delta$t) diagram shown in FIG. 4 so that a worst case load development for the load spectrum is obtained. Thus to obtain the curve shown in FIG. 4, sliding means over the load profile are formed for various time windows 0.01 s, 0.1 s, 1 s, 10 s etc. and for each time window the maximum mean is selected. In other words the load profile is smoothed to varying extents with varying size time windows, and the highest value of the smoothed load profile is selected as a maximum value for each time window.

In FIG. 4 a quadratic averaging is carried out for six different current pulse length decades. As described with reference to FIG. 2, averaged current pulses of length n×dt with current intensity $I_E$ can be obtained by forming the quadratic means of individual current pulses $I_x$. The duration differs for the various current pulse length decades, as described above for 1 s and 10 s. Preferably for each current pulse length decade, several averaged current pulses are obtained by forming a sliding mean over the temporal development of the load current.

In the case of the current pulse length decade relating to 1 s, for example as explained above a time window of 1 s length can be shifted by 250 ms for each measurement on the line 105, which takes place every 250 ms. This can be carried out for several seconds or minutes so that different averaged current pulses are obtained for this decade, wherein the maximum value from the filter for the decade 1 s is entered in the I($\Delta$t) diagram, here 50 A. The same principle can be used for the other current pulse length decades so that a temporal current distribution at the maximum permitted currents in normal operation can be obtained as a load spectrum curve by combining the maximum values or extrapolating the maximum values.

In the example shown in FIG. 4 a load spectrum curve is obtained by determining sliding quadratic means in six current pulse length decades. Depending on the loads connected to a line, it may be sufficient for less than six current pulse length decades to be used or more than six current pulse length decades, wherein also different averaging methods other than quadratic averaging can be used.

The load spectrum curve entered in the I($\Delta$t) diagram can now be used to select a line which can tolerate the maximum current pulses averaged over the different periods described above, without hard or creeping short circuits occurring or the line otherwise being heavily loaded and its life reduced. FIG. 5 shows a line for heating by 30° C. and 100° C. This line is shown to the right of the load spectrum line in the diagram which means that the maximum currents of the load spectrum curve cannot damage the line since this is designed for higher currents.

To secure the line now a tripping curve is defined which at least partially lies between the curve of the line and load spectrum curve and can also lie partially on the curve of the electric line to be secured. The two points shown in FIG. 5 on the tripping curve are examples of a first and second threshold value which were described with reference to FIG. 1.

To summarise therefore a mean is determined by quadratic averaging for all current pulse length decades for a maximum worse case load development, to establish the load spectrum curve. Then a line with a safe cross section for example 4 mm$^2$ is determined on the right in the diagram in FIG. 5 and then a tripping curve defined at least partly between the line curve and the load spectrum curve. In operation of the loads for example in normal operation of a vehicle, averaged current pulses are measured and compared with the maximum values of the decades which constitute the load spectrum curve, and if a current pulse averaged over a certain duration is greater than the threshold value allocated to this duration on the load spectrum curve, the switching element is opened and the line interrupted.

Thus as shown in FIG. 5 an intelligent fuse with adapted tripping curve can be realised. For example a 60 A Midi melt fuse will not secure the line shown in FIG. 5 on creeping short circuits and the line would fail before the fuse tripped. The tripping curve is designed such that the switching element switches and thus secures the line when 150 A is exceeded for shorter pulse lengths between 0.01 and 1 s, and when 50 A is exceeded for long pulse lengths between 100 s and 10,000 s.

Figure 6:
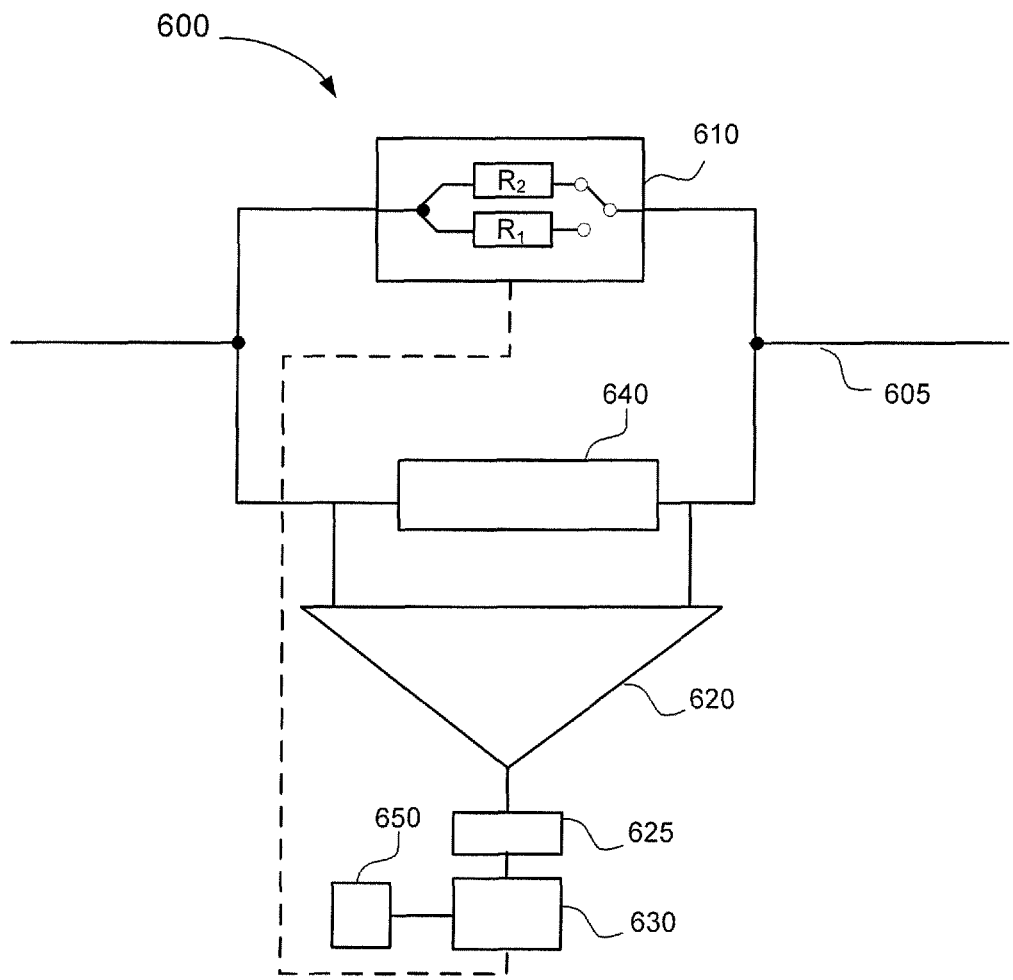
FIG. 6 shows diagrammatically a device for securing an electric line with a parallel circuit according to one embodiment.

In FIG. 1 the controllable switching element 110 was shown connected in series with the electric line. In another embodiment the device can furthermore comprise a fuse to secure the electric line, for example an electric fuse such as a melt fuse or PTC fuse. Such a device with fuse is shown in FIG. 6. The device 600 in FIG. 6 comprises a controllable switching element 610 which corresponds largely to the switching element 110 in FIG. 1, and an electric fuse 640, a current measuring device 620, an averaging device 625 and a controller 630 connected with the memory 650 which largely correspond to the units described in FIG. 1. The memory 650 can also be provided in the controller 630. The controllable switching element 610 and the electric fuse 640 are formed as a parallel circuit wherein the parallel circuit is connected in series with the electric line 605.

In particular the electric fuse 640 is arranged in a first branch of the parallel circuit which has a third resistance $R_3$ and the controllable switching element 610 is arranged in a second branch of the parallel circuit. The first resistance $R_1$ in the switching element 610 is higher than the third resistance and the second resistance in the switching element is lower than the third resistance. The switching element can be connected such that it switches to the second state on a pulse load condition to relieve the load on fuse 640. A pulse load condition here means a current pulse which would be too large for the fuse and would trip this but could still be tolerated by the line itself. Thus the pulse load condition is not an overload of the line.

In normal operation of the device 600 in FIG. 6, the switching element 610 is connected such that the switching element assumes the first resistance $R_1$. For example the switching element can be a switch wherein the resistance $R_1$ corresponds to an open state i.e. an infinite resistance, and resistance $R_2$ corresponds to a closed state i.e. a very low resistance. Therefore in normal operation the electric current of the electric line 605 flows through the fuse 640.

A pulse load condition exists for example if a current flowing through the parallel circuit or a resulting averaged current pulse exceeds a pulse load threshold value. This current pulse can cause the fuse to trip, for example melt, but is not necessarily dangerous for the line as fuses and lines have different properties, as was discussed with reference to FIG. 8. Thus on the presence of a pulse load condition the switching element 610 can switch to the second state for which the electrical resistance $R_2$ is lower than the electrical resistance $R_3$ of the electrical fuse. This takes place by switching a switch. In this second state of the controllable switching element 610, because $R_2<R_3$ the majority of the electric current flows through the electric line in the branch of switching element 610 and only a small part of the electric current flows through the electric fuse, whereby the load on this is relieved in the presence of a pulse load condition. In other words the controllable switching element 610, preferably a power MOSFET, can take over the majority of the current load on a current pulse.

The device 600 can also return to normal operation. For example the switching element can be designed to switch from the second state to the first state when the current flowing through the parallel circuit falls below another pulse load threshold value.

Furthermore the switching element 610 can be designed to switch from the second state to a first state on an overload condition so as to cause melting or burn-out of the electric fuse. In contrast to the pulse load condition mentioned above for the electric fuse, in particular for brief heavy currents, the overload condition is a pulse load condition for a particular duration or time period i.e. the overload condition of the electric line 605 is present if in general a particular high electric current flows through the electric line 605 for too long a time. As the tripping curve is defined taking into account the current pulses which can be tolerated by the line and in particular their durations, the tripping curve can be used to decide whether an overload condition case exists. The tripping curve or individual threshold values for various current pulse load decades can be stored in the memory 650.

Preferably the device 100 or device 600 is used in an onboard network of a vehicle, in particular an automobile, to secure an electric line. The electric line in the onboard network of a vehicle can be secured at load level (SRB level) or at main distributor level (Vosido level).

The device 600 for securing an electric line 605 has the further advantages in comparison with security with only one power MOSFET without parallel melt fuse, e.g. if on a hard short circuit, the power MOSFET (or other semiconductor) breaks the connection, a high voltage is induced which can destroy the power MOSFET. This energy would have to be dissipated in an additional recovery diode. In the device 600 the fuse e.g. the melt fuse takes over the energy e.g. by melting the fuse material. The power MOSFET (switching element) is thus protected against induced voltages on tripping by the melt fuse.

The operational devices 100 and 600 are described below with reference to FIGS. 7A and 7B.

Figure 7A:
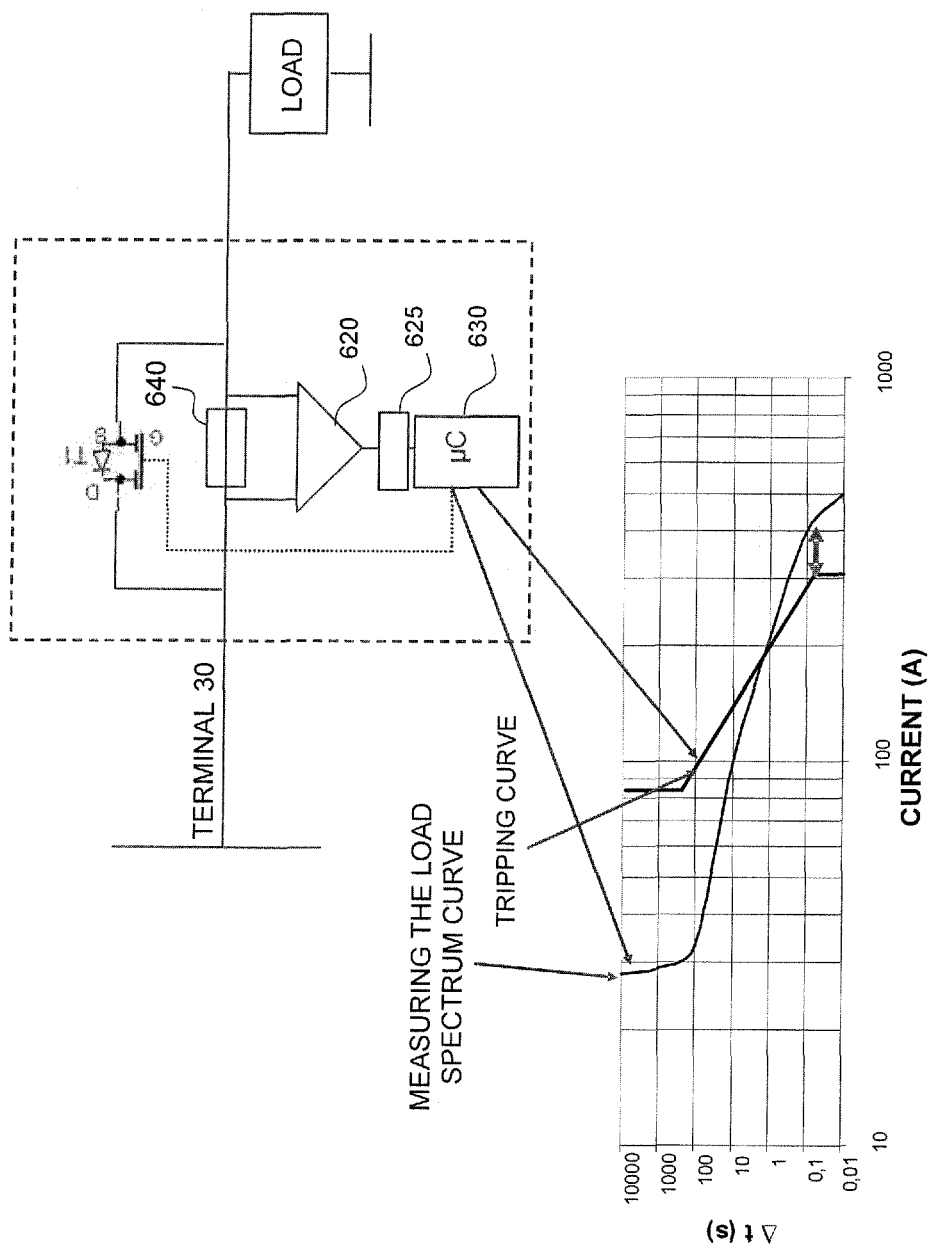
FIGS. 7A and 7B explain the functions of the devices shown in FIGS. 1 and 6.

FIG. 7A describes the operation of the device 600, wherein the controllable switching element 610 is now designed as a power semiconductor with a resistance $R_2=1$ m$\Omega$ and a resistance $R_1$ of approximately infinity. Consequently on closing of the power semiconductor (power MOSFET) T1, the majority of the electric current of the electric line flows through the power semiconductor and relieves the load on the melt fuse. On the other side the power semiconductor T1, on opening of its gate, has such a high electrical resistance $R_1$ that practically all the electric current of the electric line flows through fuse 640. In operation now always values of one load spectrum curve of operation (not to be confused with the maximum load spectrum curve previously determined and described above) is determined by the current measuring device 620 and the averaging device 625. These values constitute current pulses over the line which are averaged over different time periods e.g. the decades shown in FIG. 7A.

The controller 630, which can be formed as a microcontroller, compares the averaged current pulses measured of the load spectrum curve with values of the stored tripping curve previously determined, and if the determined current pulses of the decade filter lie above the values of the tripping curve, the fuse is tripped, i.e. the power semiconductor is opened and the melt fuse exposed to a high current which will normally cause it to melt. Thus the tripping curve in general constitutes a criterion for interrupting the line.

In FIG. 7A the power semiconductor opens for example at current pulses greater than 200 A and a duration of 1 s. In particular the power semiconductor will open for all current pulses lying on the measured load spectrum curve or stronger ones, which are shorter than 1 s, as shown by the arrow in FIG. 7A.

Figure 7B:
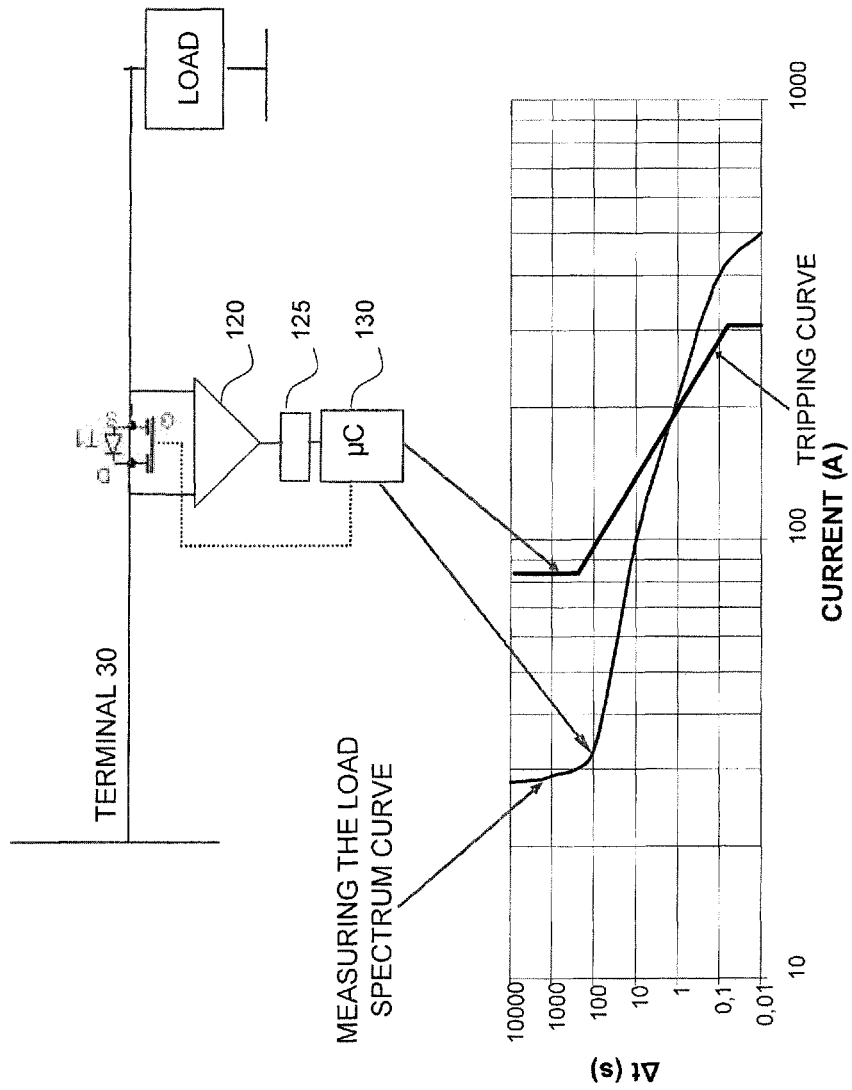

FIG. 7B describes the operation of the device 100 in which the switching element is also formed as a power semiconductor. Here too as in FIG. 7A, on operation of the loads, various averaged current pulses are measured and compared with values of the tripping curve. The tripping criterion for switching the power semiconductor is the same in FIG. 7B as in FIG. 7A.

On use in an onboard network in a vehicle, the device 600 offers the advantage over the device 100 that when the vehicle is stopped, the power semiconductor need not be connected through as small currents can flow via the fuse which constitutes a small fuse dimensioned for uniform load.

As shown above the determination of the maximum load spectrum curve thus allows a complete energy description of one or more loads with just a few values, for example six values which represent the support points of the decades. Here load spectra form the basis for optimum design of lines and fuses, which is advantageous as pulse loads cannot be described via nominal currents which in the previous designs of cable sets were used in the time range and not in the spectrum range of the pulse lengths. In addition, with a load spectrum analysis, a slow change of the load profile can indicate ageing processes. For example a seizing of a bearing in a fan motor can be noted and diagnostic bits can be set in good time.

The person skilled in the art will gather from the description above that various modifications and variations of the devices of the method of the invention can be made without leaving the scope of the invention.

Furthermore the invention was described with reference to particular examples which however should serve merely for improved understanding of the invention and not restrict this. The person skilled in the art will immediately see that many different combinations of the elements can be used to implement the present invention. Therefore the true scope of the invention is characterised by the following claims.

The invention claimed is:

1. A device for securing an electric line in a vehicle, the device comprising:
   a controllable switching element configured to assume at least two states, including a first state with a first resistance and a second state with a second resistance lower than the first resistance;
   a current measuring device configured to measure a current over the line;
   an averaging device configured to determine, on the basis of the current measured, at least one first current pulse averaged over a first duration and a second current pulse averaged over a second duration longer than the first duration; and
   a controller configured to control the switching element so that the switching element switches to the first state when the first or second averaged current pulse exceeds a first or second threshold value.

2. The device according to claim 1, wherein the averaging device is configured to obtain at least one of: as the first current pulse, the quadratic mean of several individual current pulses in the first duration; and, as a second current pulse, the quadratic mean of several individual current pulses in the second duration.

3. The device according to claim 1, comprising a memory configured to store the first and second threshold values of a tripping curve which indicates at which current pulses the switching element is to be controlled.

4. The device according to claim 3, wherein the memory is configured to store at least four threshold values of the tripping curve for four different current pulse length decades.

5. The device according to claim 4, wherein the four current pulse length decades extend over a duration of one of 0.01 s; 0.1 s; 10 s and 100 s.

6. The device according to claim 1, wherein the tripping curve corresponds at least partly to the characteristic curve of the electric line to be secured.

7. The device according to claim 1, wherein the controllable switching element can be connected in series with the electric line.

8. The device according to claim 1, further comprising an electric fuse for securing the electric line.

9. The device according to claim 8, wherein the controllable switching element and the electric fuse are configured as a parallel circuit, with the parallel circuit being connectable in series with the electric line.

10. The device according to claim 9, wherein the electric fuse is arranged in a first branch of the parallel circuit which has a third resistance and the controllable switching element is arranged in a second branch of the parallel circuit, wherein the first resistance is higher than the third resistance and the second resistance is lower than the third resistance, and the switching element is configured to switch to the second state on a pulse load condition.

11. The device according to claim 10, wherein the pulse load condition is an exceedance of a pulse load threshold value by the averaged current pulse flowing through the parallel circuit.

12. The device according to claim 10, wherein the controllable switching element is configured to switch from the second state to the first state on an overload condition.

13. The device according to claim 11, wherein the controllable switching element is configured to switch from the second state to the first state when the averaged current pulse flowing through the parallel circuit falls below a second pulse load threshold value.

14. The device according to claim 1, wherein the current measuring device is connected in series with at least one of the switching element and the electric fuse to measure the current pulses.

15. The device according to claim 1, in combination with an onboard network for power supply of a vehicle.

16. A method for securing an electric line in a vehicle, the method comprising:
    measuring a current over the line;
    determining, on the basis of the current measured, at least one first current pulse averaged over a first duration and a second current pulse averaged over a second duration which is longer than the first duration; and
    switching of a switching element from a second state to a first state when the first or second averaged current pulse exceeds a first or second threshold value,
    wherein the first state has a first resistance and the second state has a second resistance which is lower than the first resistance.

17. The method according to claim 16, wherein the threshold values of a tripping curve are selected such that they lie on a curve or between values of the curve and a load spectrum curve which shows a temporal current distribution at the maximum permitted currents in normal operation of a least one load on the line.

* * * * *